No. 739,949. PATENTED SEPT. 29, 1903.
H. L. TOWLER.
STREET OR STATION INDICATOR.
APPLICATION FILED NOV. 12, 1902.
NO MODEL. 6 SHEETS—SHEET 1.
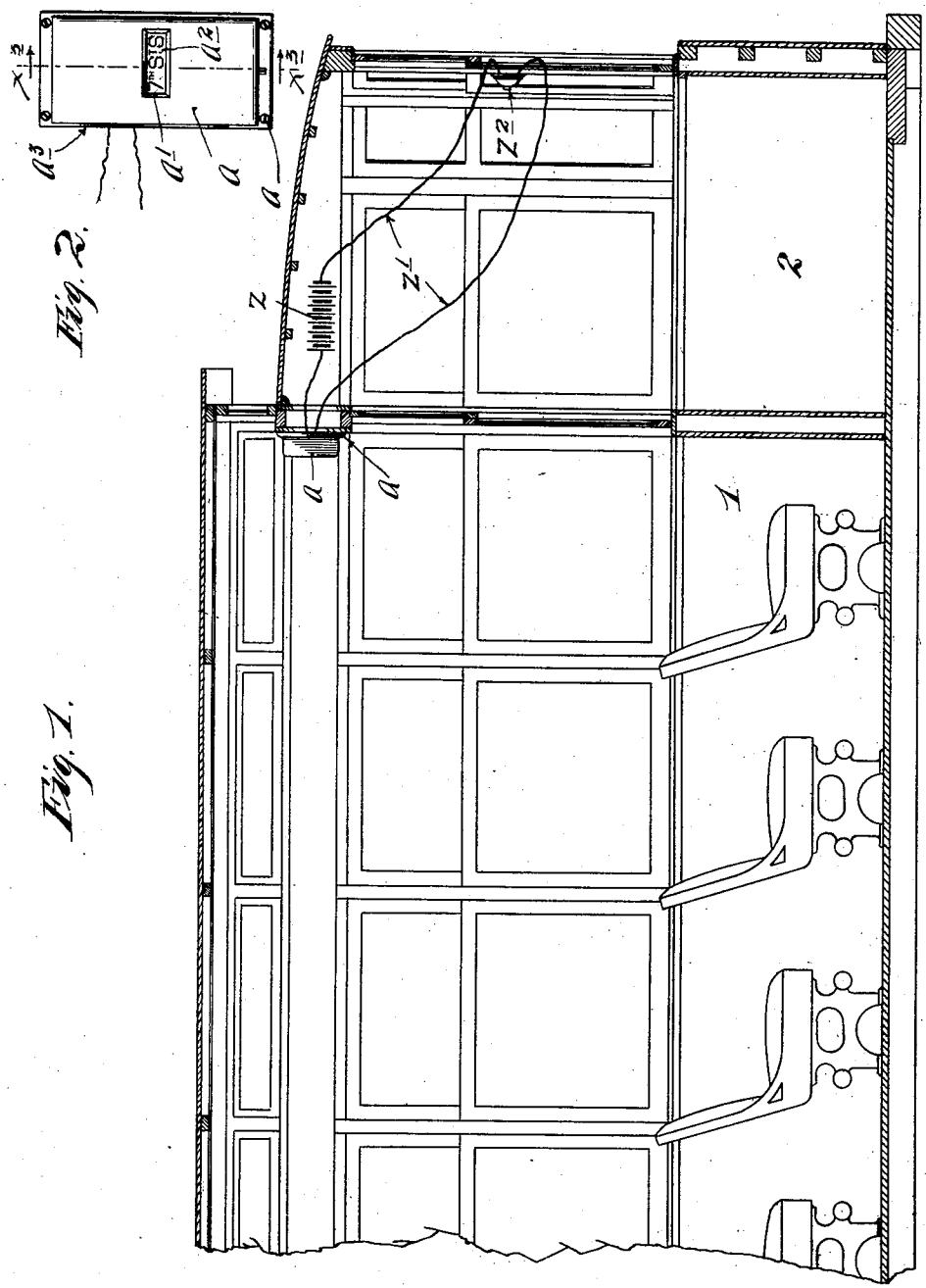

No. 739,949. PATENTED SEPT. 29, 1903.
H. L. TOWLER.
STREET OR STATION INDICATOR.
APPLICATION FILED NOV. 12, 1902.
NO MODEL. 6 SHEETS—SHEET 2.
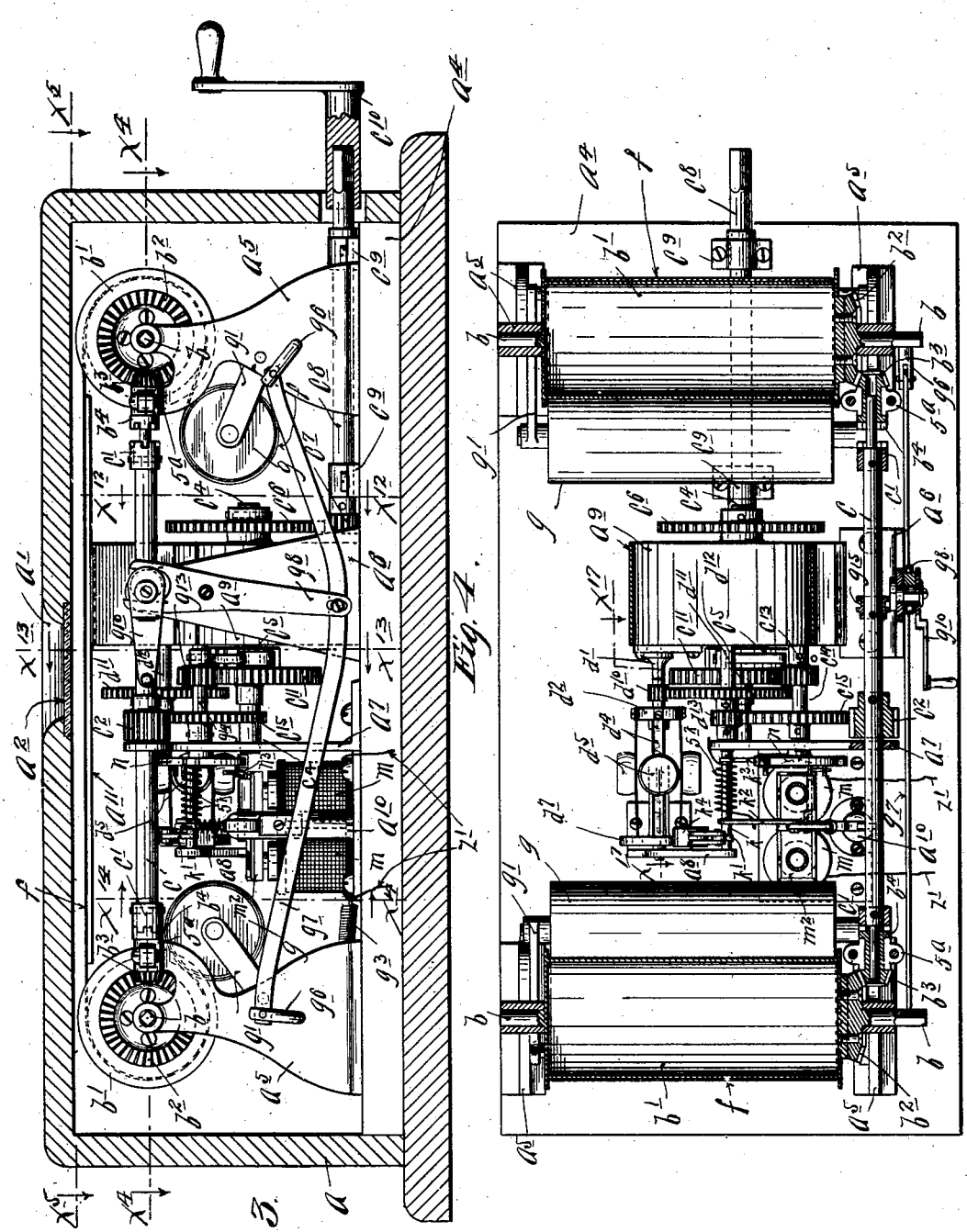
Witnesses.
H. D. Kilgor
E. P. Williamson
Inventor:
Henry L. Towler.
By his Attorneys.
Williamson Merchant No. 739,949. PATENTED SEPT. 29, 1903.
H. L. TOWLER.
STREET OR STATION INDICATOR.
APPLICATION FILED NOV. 12, 1902.
NO MODEL. 6 SHEETS—SHEET 3.

Witnesses.
H. D. Kilgore
E. D. Williamson

Inventor.
Henry L. Towler.
By his Attorneys.
Williamson & Merchant

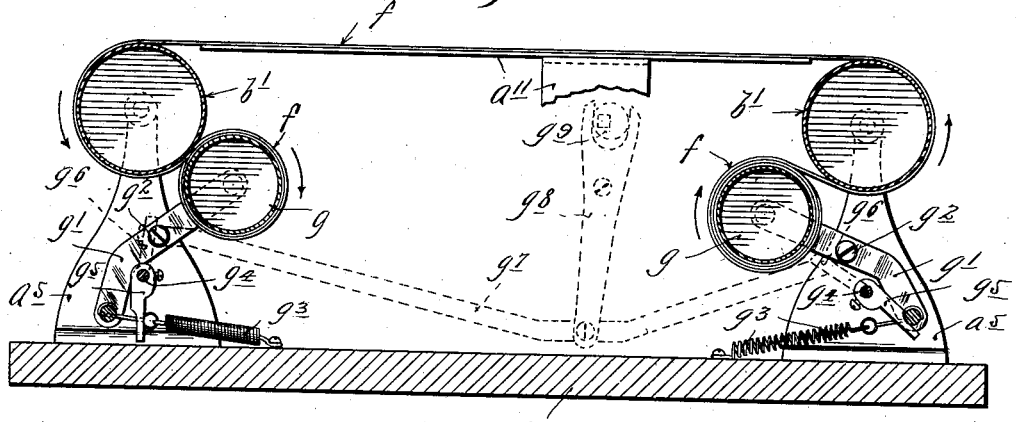
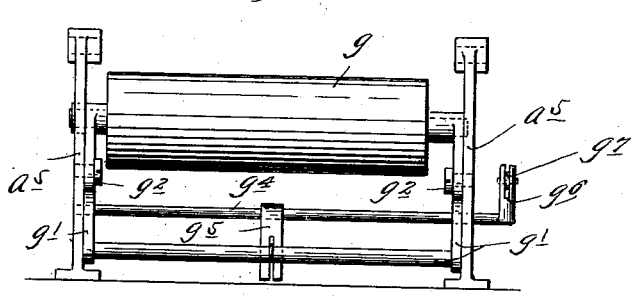
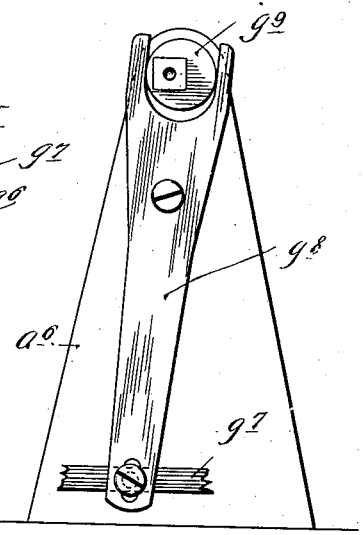
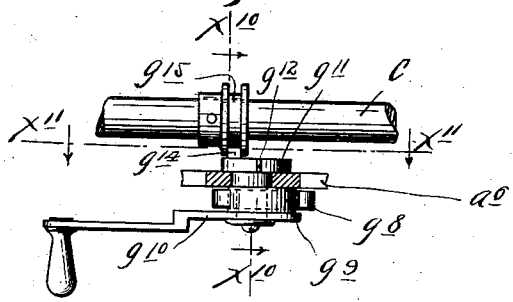
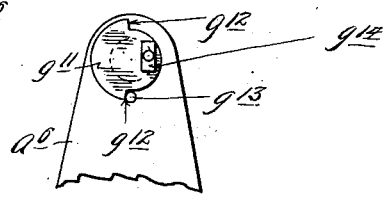

No. 739,949. PATENTED SEPT. 29, 1903.
H. L. TOWLER.
STREET OR STATION INDICATOR.
APPLICATION FILED NOV. 12, 1902.
NO MODEL. 6 SHEETS—SHEET 5.

Witnesses.
H. D. Kilgore
E. F. Williamson

Inventor.
Henry L. Towler.
By his Attorneys.
Williamson & Merchant

No. 739,949. PATENTED SEPT. 29, 1903.
H. L. TOWLER.
STREET OR STATION INDICATOR.
APPLICATION FILED NOV. 12, 1902.
NO MODEL. 6 SHEETS—SHEET 6.
Fig. 14.
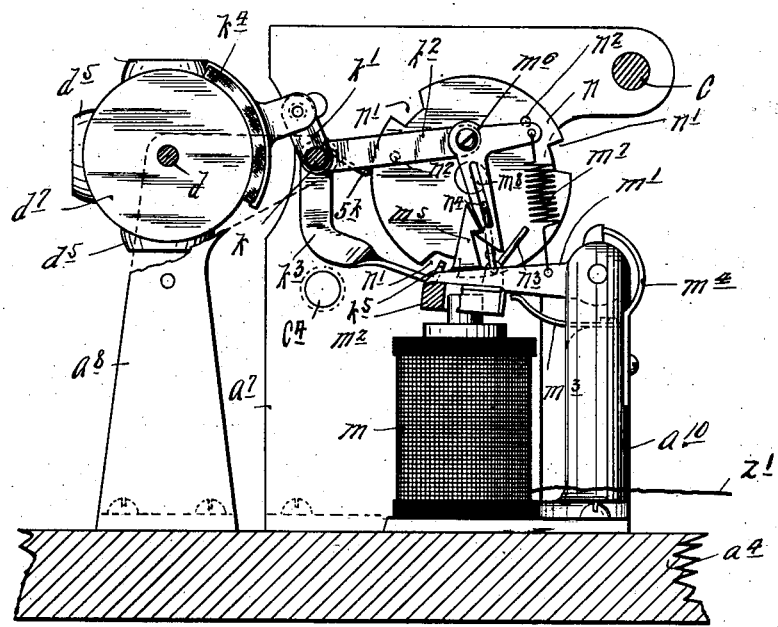
Fig. 17. Fig. 15.
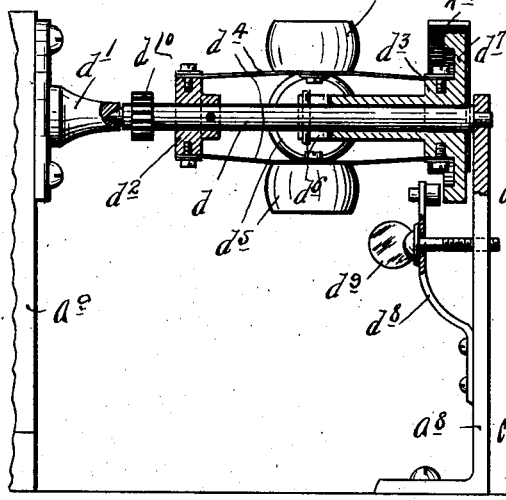
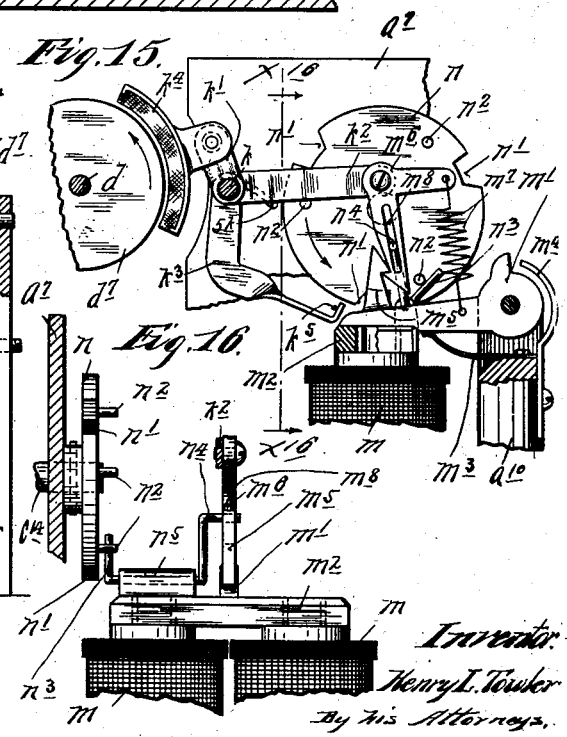
Fig. 16.
Witnesses: Inventor:
H. D. Kilgore Henry L. Towler
E. J. Williamson By his Attorneys,
Williamson Merchant
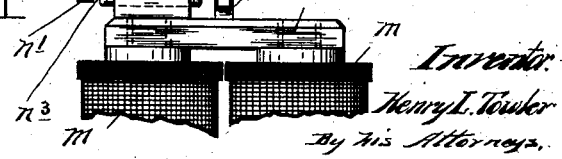

No. 739,949. Patented September 29, 1903.

UNITED STATES PATENT OFFICE.

HENRY L. TOWLER, OF MINNEAPOLIS, MINNESOTA.

STREET OR STATION INDICATOR.

SPECIFICATION forming part of Letters Patent No. 739,949, dated September 29, 1903.

Application filed November 12, 1902. Serial No. 131,002. (No model.)

*To all whom it may concern:*

Be it known that I, HENRY L. TOWLER, a citizen of the United States, residing at Minneapolis, in the county of Hennepin and State of Minnesota, have invented certain new and useful Improvements in Street or Station Indicators; and I do hereby declare the following to be a full, clear, and exact description of the invention, such as will enable others skilled in the art to which it appertains to make and use the same.

My invention has for its object to provide an improved street or station indicator adapted for use on street-cars and railway-trains; and to this end it consists of the novel devices and combinations of devices hereinafter described, and defined in the claims.

The invention is illustrated in the accompanying drawings, wherein like characters indicate like parts throughout the several views.

Figure 5:
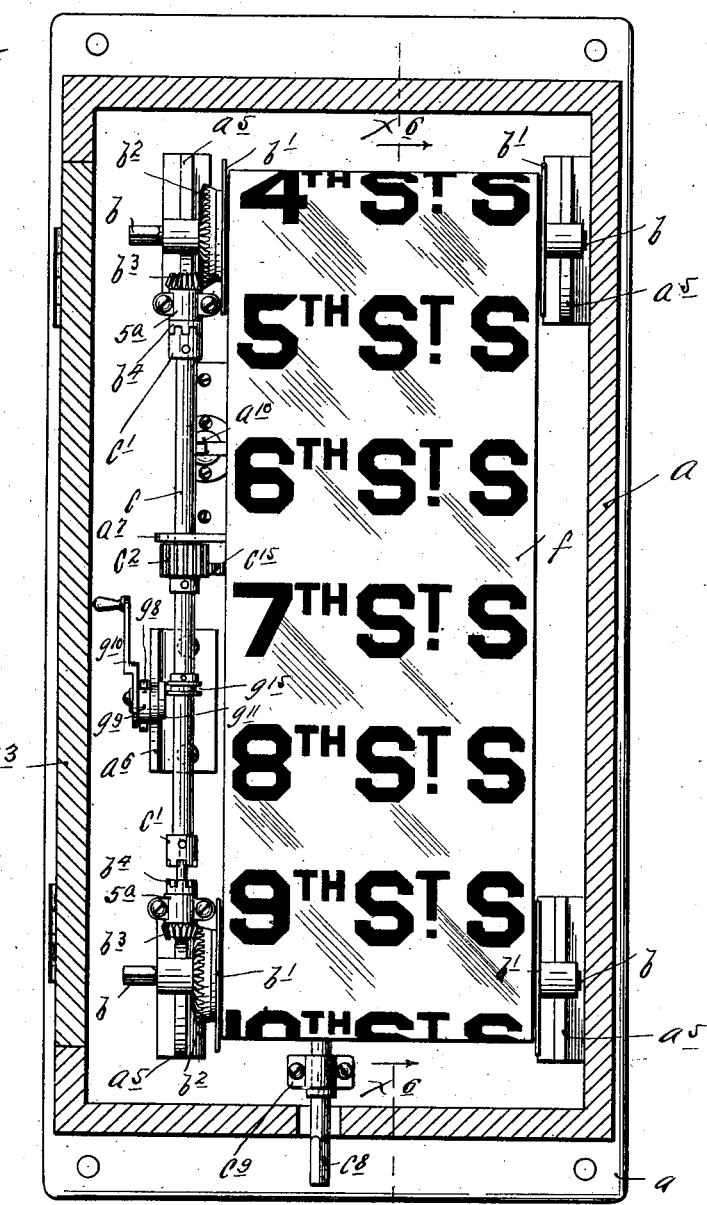
Figure 12:
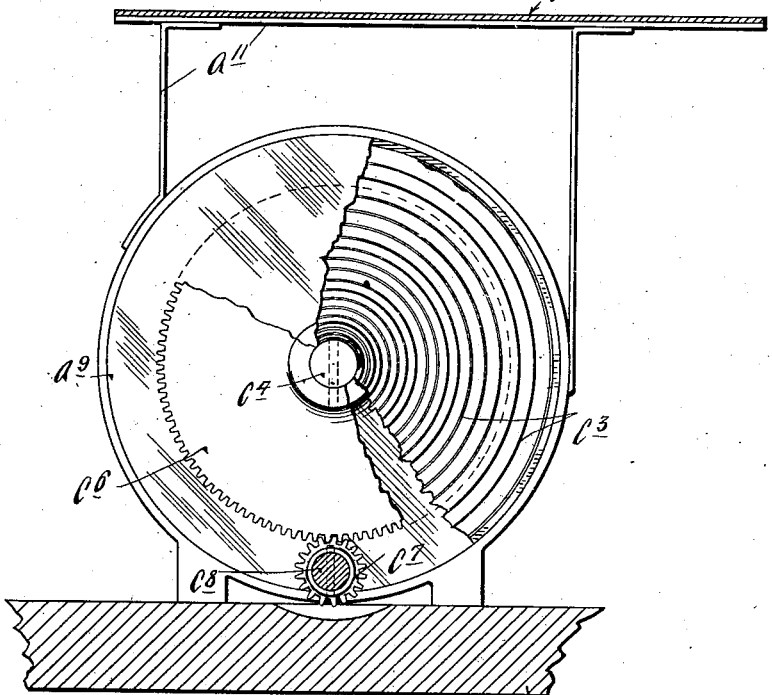
Figure 13:
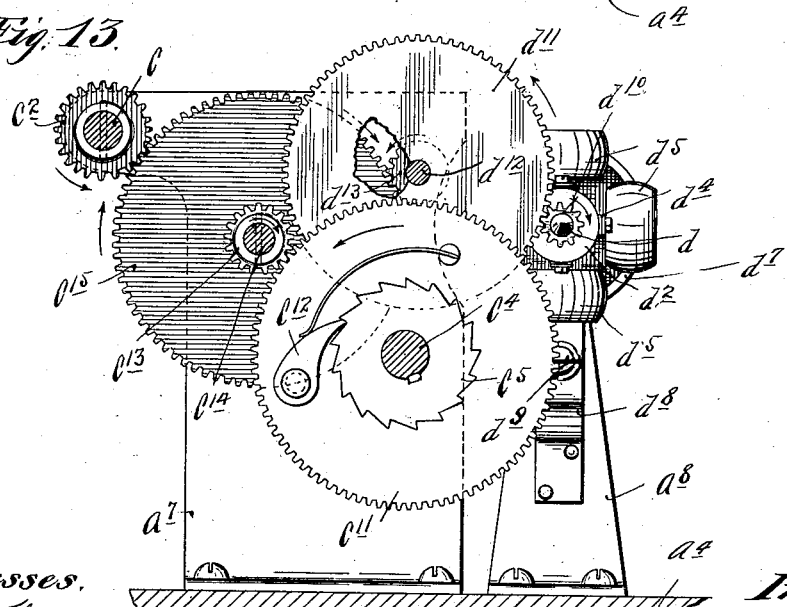

Figure 1 is a view showing a portion of a street-car in longitudinal vertical section and showing in side elevation one of the improved indicators applied in working position thereto. Fig. 2 is a front or face view of the indicator removed from working position. Fig. 3 is a vertical section on the line $x^3 x^3$ of Fig. 2. Fig 4 is a view, principally in transverse section, on the line $x^4 x^4$ of Fig. 3, but with parts of the case removed. Fig. 5 is a front elevation or face view of the indicator with the case thereof sectioned on the line $x^5 x^5$ of Fig. 3. Fig. 6 is a vertical section on the line $x^6 x^6$ of Fig. 5, some parts being removed and others being indicated by dotted lines. Fig. 7 is a detail in end elevation looking upward and showing portions of the ribbon supporting and feeding devices, some parts being removed. Fig. 8 is a detail view, in side elevation, showing a portion of the drive-reversing device. Fig. 9 is a detail in front elevation, but with parts broken away, showing still other portions of the drive or feed-reversing device. Fig. 10 is a section on the line $x^{10} x^{10}$ of Fig. 9. Fig. 11 is a section on the line $x^{11} x^{11}$ of Fig. 9. Fig. 12 is a transverse section on the line $x^{12} x^{12}$ of Fig. 3, some parts being broken away. Fig. 13 is a transverse section on the line $x^{13} x^{13}$ of Fig. 3, some parts being broken away. Fig. 14 is a section on the line $x^{14} x^{14}$ of Fig. 3, some parts being broken away. Fig. 15 is a view corresponding to Fig. 14, but illustrating different positions of the parts. Fig. 16 is a transverse section on the line $x^{16} x^{16}$ of Fig. 15; and Fig. 17 is a detail in section on the irregular line $x^{17} x^{17}$ of Fig. 4, some parts being broken away.

What at present is considered the best form of the indicator is illustrated in the accompanying drawings, and as a brief forecast of the mechanism to be hereinafter more specifically described the following statements are made: The streets or stations are marked on a long wide ribbon, which is supported by feed-rollers and holding-rollers of special arrangement. These rollers, and consequently the ribbon, are moved by feeding mechanism involving a motor, preferably a spring-motor, and an intermediate drive. The motor is thrown into action intermittently by a trip, which is preferably a magnetic trip. After the motor has run long enough to impart a proper step of movement to the rollers and ribbon it is brought to a stop by an automatically-actuated friction-brake. The action of this friction-brake is reinforced or augmented by a positive stop, which is also automatically actuated. A device is also provided whereby at the ends of the route or trip the action of the drive or feeding devices on the rollers may be reversed, so that on a return trip the streets or stations will be exhibited in reverse order. The above mechanism is placed within a case which is provided with a sight-opening, through which the markings on the ribbon indicating the streets or stations are displayed in succession.

In Fig. 1 the numeral 1 indicates the body of an ordinary street-car provided at its forward end with the motorneer's vestibule 2.

The character $a$ indicates a rectangular case or box in which the mechanisms of the indicator are mounted. In its front face the box $a$ is provided with a sight-opening $a'$, preferably closed by a transparent pane $a^2$. Also, as shown, the case $a$ is provided at one side with a door $a^3$, which when opened gives access to the interior mechanism. Secured within and to the back of the case $a$ is a flat support $a^4$, on which are secured bearing-brackets $a^5 a^6 a^7 a^8$, a motor-case $a^9$, and a supporting-post $a^{10}$. The motor-case $a^9$ supports a guide-board $a''$, which extends parallel to the front plate of the case $a$. In the brackets $a^5$ are journaled the shafts $b$ of large rollers or drums $b'$. Preferably the shafts $b$ are squared or made angular at those ends which project next to the door $a^3$, so that a wrench may be applied thereto to turn the rollers. At their same ends, but inward of the adjacent brackets $a^5$, the rollers $b'$ are provided with beveled gears $b^2$, which mesh with beveled pinions $b^3$, the sleeve-like hubs of which are loosely journaled in projections $5^a$ of the adjacent brackets $a^5$ and are provided with half-clutches $b^4$, as best shown in Figs. 3 and 4. Loosely journaled with freedom for a limited sliding movement within the sleeves or hubs of said pinions $b^3$ is a driving-shaft $c$, which is provided with rigidly-secured half-clutches $c'$ and with a wide-faced pinion $c^2$. The intermediate portion of said shaft $c$ is also journaled in the bearing-bracket $a^7$. By endwise movements of the shaft $c$ the half-clutches $c'$ may be alternately engaged with the coöperating half-clutches $b^4$. Within the motor-case $a^9$ is a large motor-spring $c^3$, the outer end of which is secured to the said case and the inner end of which is secured to a short shaft $c^4$, mounted in the sides of said case. At one end the shaft $c^4$ is provided with a ratchet-wheel $c^5$, and at its other end it is provided with a gear $c^6$. The gear $c^6$ meshes with a pinion $c^7$, carried by a shaft $c^8$, journaled in suitable bearings $c^9$ on the plate $a^4$. One end of the shaft $c^8$ projects outward through an opening in the case $a$, and this projecting end is square or formed angular, so that it may be turned by means of a crank-key or wrench $c^{10}$. Loosely mounted on the shaft $c^4$ adjacent to the ratchet-wheel $c^5$ is a large spur-gear $c^{11}$, which carries a spring-pressed pawl $c^{12}$ for coöperation with the said ratchet-wheel to drive said gear, as indicated by the arrow marked thereon in Fig. 13. The gear $c^{11}$ meshes with a pinion $c^{13}$, carried by a counter-shaft $c^{14}$, loosely journaled in one side of the motor-case $a^9$ and in the bracket $a^7$. This counter-shaft $c^{14}$ carries a large spur-gear $c^{15}$, which always remains in mesh with the wide-faced shifting pinion $c^2$ of the sliding shaft $c$, as best shown in Figs. 4 and 13. To hold back or retard the movements of the feeding devices, a governor is preferably provided. As shown, this governor involves as follows: The character $d$ indicates a counter-shaft journaled in the bracket $a^8$ and in a bearing $d'$ on the motor-case. The shaft $d$ carries a rigidly-secured head $d^2$ and a sliding head $d^3$, which heads are connected by several spring-straps $d^4$, provided at their intermediate portions with weights $d^5$. As shown, the sliding head $d^3$ is connected for rotation with the shaft $d$ by a slot-and-pin connection $d^6$. The said head $d^3$ has a projecting flange or wheel $d^7$, which constitutes the rotary friction member of a friction-brake. When the shaft $d$ is rotated at too high speed, the weights $d^5$ are thrown outward and move the inner face of the friction-wheel $d^7$ against a relatively fixed brake-shoe $d^8$, which, as shown, is adjustably secured to the bracket $a^8$ by means of a thumb-screw $d^9$, all as best shown in Fig. 17. The said friction-wheel $d^7$ also constitutes one element of a friction-brake for bringing the motor and driving mechanism to a stop after proper feed movements have been imparted. On the shaft $d$ is a pinion $d^{10}$, which meshes with a gear $d^{11}$ on a shaft $d^{12}$, mounted in the bracket $a^7$ and case $a^9$ and provided also with a pinion $d^{13}$, meshing with the gear $c^{15}$.

The names of the streets or stations or the numbers thereof, as the case may be, are marked on a long wide-faced ribbon $f$, which runs over the feed-rollers $b'$ and over the guide-board $a''$. This ribbon is drawn taut, and its ends are wound upon and attached to so-called "holding-rollers" $g$, which rollers are loosely journaled in oscillating frames $g'$, pivotally connected at $g^2$ to the corresponding pairs of brackets $a^5$. Springs $g^3$, connected to the lower portions of said frames $g'$ and to the plate $a^4$, tend to press the coöperating rollers $b'$ and $g$ together. (For this construction see particularly Figs. 6 and 7.) The winding-roller $g$ onto which the ribbon is at any particular time being wound is spring-pressed against the coöperating feed-rollers $b'$, while the other roller $g$ is moved away from its coöperating roller $b'$. The said rollers $g$ are thus thrown into action in alternate order by means of a roller-shifting device, preferably constructed as follows: Loosely mounted in each pair of brackets $a^5$ below each coöperating pair of rollers $b'$ $g$ is a rock-shaft $g^4$, which at its intermediate portion is provided with a depending arm $g^5$, which arm when moved outward engages the lower bar portion of the corresponding frame $g'$ and oscillates the same against its spring $g^3$, so as to carry the corresponding roller $g$ away from its coöperating feed-roller $b'$, as indicated at the right in Fig. 6. At one side of the device the two rock-shafts $g^4$ project through the brackets $a^5$ and are provided with arms $g^6$, which are connected for simultaneous movement by a long link or strap $g^7$. This link $g^7$, acting through the rock-shafts $g^4$ and their arms $g^5$, serves to throw the rollers $g$ into and out of action in alternate order, as above indicated. To oscillate the link $g^7$, an arm $g^8$ is pivoted thereto and to the bracket $a^6$, as best shown in Figs. 3, 6, and 8. The upper end of the arm or lever $g$ is bifurcated and embraces an eccentric $g^9$, which is journaled in the bracket $a^6$ and provided with a crank $g^{10}$, by means of which it may be oscillated. The trunnion or journal of the eccentric $g^9$ is provided on the inner side of the bracket $a^6$ with a crank-disk $g^{11}$, having stop-shoulders $g^{12}$, which coöperate with a stop-pin $g^{13}$ on the bracket $a^6$ to limit the movements of said eccentric. (For the above construction see particularly Figs. 8 to 11, inclusive.) The crank-disk $g^{11}$ is provided with a pivoted wrist-block $g^{14}$, which works in the annular channel of a sleeve $g^{15}$, rigidly secured on the sliding shaft $c$. When by the movement of the crank-lever $g^{10}$ and connections just described the left-hand roller, as shown in Fig. 3, for instance, is thrown into action, the shaft $c$ will be moved toward the left and the left-hand half-clutches $c'$ and $b^4$ are engaged, thereby causing the left-hand feeding roller or drum $b'$ to become the driver, and thereby move the ribbon $f$ from the right toward the left. Of course just the reverse action takes place under reverse movement of the said crank-lever $g^{10}$.

Attention will now be directed particularly to Figs. 4, 14, 15, and 16. The character $k$ indicates a short rock-shaft, which is mounted in the brackets $a^7$ and $a^8$ and has rigidly secured to its intermediate portion three arms $k'$, $k^2$, and $k^3$. To the arm $k'$ is pivotally connected a segmental brake-shoe $k^4$, which coöperates with the outer surface of the friction-wheel $d^7$, heretofore described and best shown in Fig. 17. This brake-shoe is preferably faced with leather, wood fiber, or other suitable non-magnetic material. Strong springs $5^k$, coiled around the rock-shaft $k$, with one end anchored to the bracket $a^7$ and the other end pressing on the arm $k^2$, tend to keep the brake-shoe forced against the friction-wheel $d^7$, thereby holding inactive the motor-spring $c^3$ and part driven thereby.

The frictional brake or stop device above described is released by a magnetic trip involving, as shown, a pair of magnets $m$ and coöperating lever $m'$, pivoted to the post $a^{10}$ and provided at its free end with an armature $m^2$, which is subject to said magnets. A spring $m^3$ of the post $a^{10}$ normally forces said lever and armature away from the magnets and against a stop $m^4$, also on said post $a^{10}$. Said lever $m'$ is further provided with a projecting hook-lug $m^5$, which normally engages with the hooked end of a bell-crank $m^6$, pivoted to the free end of the arm $k^2$. The outwardly-projecting arm of the bell-crank lever $m^6$ is connected to the arm $m'$ by a light spring $m^7$, which tends to keep the hooked arm of the bell-crank in engagement with the hook-lug $m^5$. At its left-hand end with respect to Figs. 3 and 4 the counter-shaft $c^{14}$, already described, is provided with a disk $n$, having a plurality (as shown, three) of notches $n'$, as best shown in Figs. 14, 15, and 16. The disk $n$ also carries three laterally-projecting tripping-pins $n^2$, which at the proper times engage the trip-finger $n^3$ of a rock-shaft or crank $n^4$, mounted in a bearing $n^5$ on the armature $m^2$. The other arm of the crank $n^4$ is bent laterally and works in a longitudinal slot $m^8$, formed in the depending arm of the bell-crank $m^6$. At its free end the depending arm $k^3$ of the rock-shaft $k$ is bent to form a stop-lug or detent $k^5$, which, as hereinafter described, coöperates with the notches $n'$ of the disk $n$ to form a positive stop to the motor. The magnets $m$ may be energized from any suitable source; but as illustrated in Fig. 1 they are energized from a battery $z$, forming part of a circuit $z'$, which is normally broken, but is adapted to be closed at will by an ordinary push-button $z^2$, located within the motorneer's vestibule within easy reach of the motorneer.

Operation: With the device applied to a street-car, as illustrated in the drawings, its operation is substantially as follows: On approaching the street the motorneer presses the button, thereby closing the circuit $z'$ and causing the magnets to be energized. These magnets being energized, draw downward the armature $m^2$ and lever $m'$, under which movement the hook $m^5$, acting on the hooked end of the bell-crank $m^6$, draws down the lever $k^2$, and thereby releases the brake-shoe $k^4$ from the friction-wheel $d^7$ and, further, carries the detent $k^5$ of the arm $k^3$ out of the particular notch $n'$ of the disk $n$, all as shown in Fig. 15. The friction-wheel $d^7$ and the disk $n$ being released, release the motor-spring $c^3$, and the said motor-spring, through connections already clearly described, impart movement to the operative pair of measuring-rollers and winding or holding rollers onto which the ribbon at the time is being wound. The initial movement of the disk $n$ carries one of the tripping-pins $n^2$ into engagement with the finger $n^3$ of the crank-shaft $n^4$, and the said crank being thus moved disengages the hooked end of the bell-crank $m^6$ from the hook $m^5$ of the lever $m'$. The bell-crank being thus released, the spring $6^k$ tends to throw the brake-shoe $k^4$ back against the friction-wheel $d^7$; but such engagement for the time being is prevented by the detent $k^5$, which then rides upon the periphery of the said disk. As soon, however, as the next notch $n'$ of the disk $n$ is moved into alinement with the detent $k^5$ of the arm $k^3$ said detent moves into said notch, and the said arm under the action of the spring $5^k$ then receives sufficient movement to again set the brake-shoe $k^4$ against the friction-wheel $d^7$, thereby stopping the motor and the driving mechanism operated thereby. The movement above indicated imparts the proper step of movement to the feed-ribbon. Of course whenever the finger is removed from the button $z^2$ the circuit $z'$ is broken and the magnets $m$ are demagnetized, whereupon the armature-lever $m'$ is thrown upward by the spring $m^3$, thereby again engaging its hook $m^5$ with the hooked end of the bell-crank $m^6$. The parts are then back in the normal positions. (Indicated in Fig. 14.)

The friction-brake above described brings the running parts to a stop without jar or jolt and is usually sufficient to insure the stopping of the same at the proper time and in proper positions. However, the detent $k^5$ of the lever $k^3$ when positioned in one of the notches $n'$ of the disk $n$ will in case of slight slipping of the brake become a positive stop to intercept the movement of said disk at the proper point. As the ribbon is wound onto the holding-roller $g$, which at the particular time is the receiving member, the said roller is caused to gradually recede from the coöperating feeding-roller $d'$; but its spring $g^3$ all the while forces the same toward the said feeding-roller, so that the latter is given sufficient frictional contact with the ribbon to insure the proper step of movement of the said ribbon. This construction has its obvious importance. As the ribbon is not wound upon or from the feeding-rollers, but simply passes over the same, a given movement of the said rollers will always impart the same movement to the said ribbon, while the varying diameter of the roll of ribbon on the holding-rollers does not vary the amount of movement given to the ribbon.

The manner in which the ribbon-feeding mechanism is reversed has already been clearly described.

The purpose of moving the roll $g$ off from which the ribbon is at any particular time being fed away from the coöperating roller $b'$ is to prevent the ribbon on the said roller $g$ from becoming loose and bulging. In practice I have found that to prevent bulging of the ribbon on the roller $g$ from which the same is being unwound it is necessary to separate the coöperating rollers $g$ and $b'$, as above set forth.

What I claim, and desire to secure by Letters Patent of the United States, is as follows:

1. A street or station indicator comprising an element marked with the streets or stations, a drive for moving the same involving a motor, a trip for intermittently throwing said motor into action, a brake for stopping said motor after the proper movement has taken place, and a positive stop reinforcing the action of said brake, substantially as described.

2. A street or station indicator comprising an element marked with the streets or stations, a driving mechanism for the same involving a motor, a brake normally restraining said motor, an electric tripping device for releasing said brake, and means for again throwing said brake into action after a predetermined feed movement has taken place, substantially as described.

3. A street or station indicator comprising a ribbon marked with the streets or stations, rollers supporting said ribbon, driving mechanism for said rollers involving a motor, a friction-wheel and a notched rotary disk, a spring set-brake coöperating with said friction-wheel and normally restraining said motor, an arm movable with said brake and having a detent coöperating with the notches in said disk as a positive stop and riding on the periphery thereof to hold the brake released, a magnetic trip for releasing said brake, involving an armature, a divided connection between said armature and the brake connections, and a device whereby the initial movement of said notched disk uncouples said divided connection, substantially as described.

4. The combination with a ribbon marked with the streets or stations, of feed-rollers over which said ribbon is passed, and coöperating holding-rollers for the ribbon yieldingly pressed toward the corresponding feed-rollers, substantially as described.

5. The combination with a ribbon marked with the streets or stations, of feed-rollers over which the ribbon is passed, coöperating spring-pressed winding-rollers for the ribbon, and connections whereby said holding-rollers are alternately thrown into and out of action with respect to the coöperating feed-rollers, substantially as described.

In testimony whereof I affix my signature in presence of two witnesses.

HENRY L. TOWLER.

Witnesses:
 ELIZABETH KELEHER,
 F. D. MERCHANT.